H. N. OTT & K. LEUCHSENRING.
FINE ADJUSTMENT FOR MICROSCOPES.
APPLICATION FILED NOV. 17, 1909.
987,393.
Patented Mar. 21, 1911.
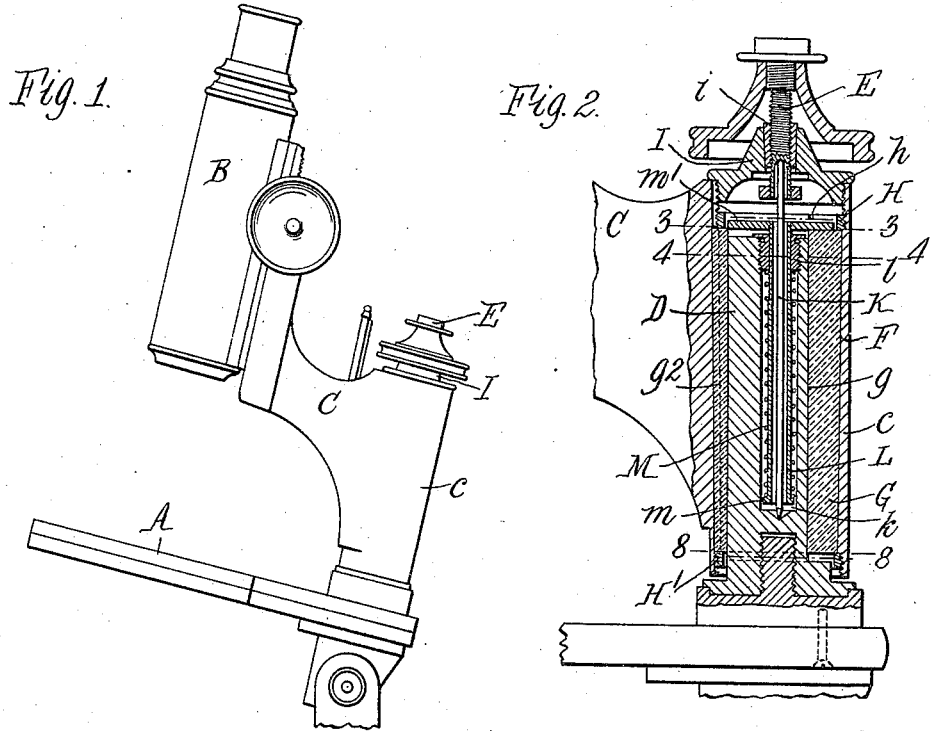
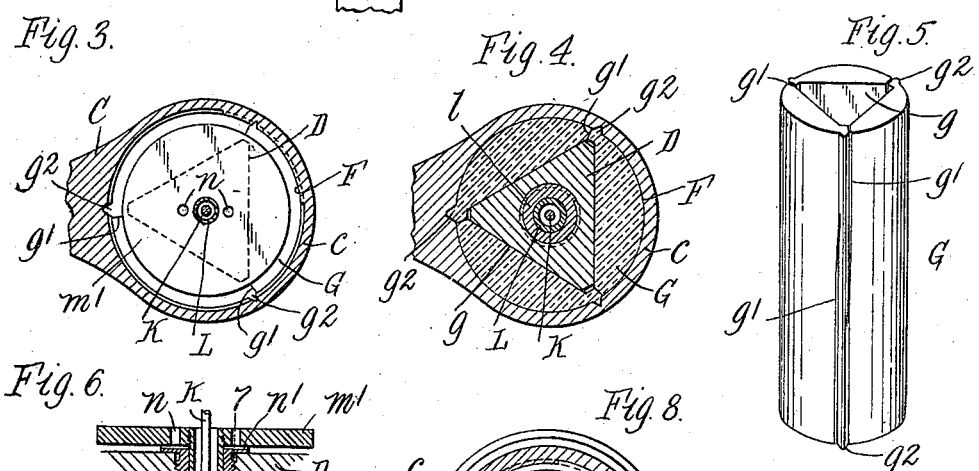
Witnesses.
A. G. Dimond.
C. H. Bund.
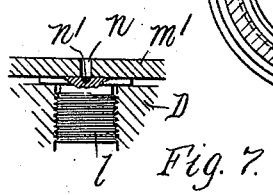
Inventors.
Harry N. Ott,
Konrad Leuchsenring,
By Wilhelm Ritter Head,
Attorneys.

UNITED STATES PATENT OFFICE.

HARVEY N. OTT AND KONRAD LEUCHSENRING, OF BUFFALO, NEW YORK, ASSIGNORS TO SPENCER LENS COMPANY, OF BUFFALO, NEW YORK.

FINE ADJUSTMENT FOR MICROSCOPES.

987,393.     Specification of Letters Patent.     Patented Mar. 21, 1911.

Application filed November 17, 1909. Serial No. 528,575.

*To all whom it may concern:*

Be it known that we, HARVEY N. OTT and KONRAD LEUCHSENRING, citizens of the United States, residing at Buffalo, in the county of Erie and State of New York, have invented a new and useful Improvement in Fine Adjustments for Microscopes, of which the following is a specification.

This invention relates to improvements in fine adjustments for microscopes, and has for one of its objects to provide guide means between the adjustable tube-carrying-arm and the supporting prism or column therefor which will insure freedom of movement of the arm on the prism without friction and without lateral motion of the arm, but which nevertheless requires the minimum amount of accurate machine work, thereby materially reducing the cost of manufacture of the instrument.

Other objects of the invention are to so construct and arrange the connections for transmitting the motion of the micrometer screw of the fine adjustment to the tube-carrying-arm that they can be located wholly in the vertical bore of the prism or column and without requiring the prism to be slotted or the arm to be furnished with any lateral stud or part extending into the prism, thereby further reducing the machine work on the instrument and enabling the arm to be made without holes or attached parts which detract from its neat appearance; and also to improve the construction of fine adjustments for microscopes in the respects hereinafter described and set forth in the claims.

In the accompanying drawings: Figure 1 is a side elevation of the upper portion of a microscope provided with a fine adjustment embodying the invention. Fig. 2 is a fragmentary sectional elevation thereof on an enlarged scale. Figs. 3 and 4 are cross-sections thereof, on an enlarged scale, respectively in lines 3—3 and 4—4, Fig. 2. Fig. 5 is a perspective view of the guide gib removed. Fig. 6 is a detail section, on an enlarged scale, of the arm adjusting connections. Fig. 7 is a section in line 7—7, Fig. 6. Fig. 8 is a cross-section of the arm and prism, on an enlarged scale, in line 8—8, Fig. 2.

Like reference characters refer to like parts in the several figures.

A represents the stage, B the lens tube, C the tube-carrying-arm, D the upright supporting prism or column for the tube-carrying-arm, and E the micrometer or fine adjustment screw of a microscope. These parts perform their usual and well known functions and except as hereinafter provided may be of any usual or suitable construction. The tube-carrying-arm is slidable on the prism on which it is moved vertically by the micrometer screw E for effecting a fine adjustment of the lens-tube relative to the object on the stage.

The prism or column D, as usual, is of prismatic shape, but instead of the usual construction in which the sleeve $c$ of the tube-carrying-arm is made with a guide hole to fit the prism and having plane faces corresponding to the plane faces of the prism and which must be accurately machined, and in which an adjustable gib is provided which must also be accurately machined, the following improved construction of the guide for the arm is employed: The sleeve $c$ of the arm is provided with a circular bore F which tapers slightly, preferably downwardly, and in this bore, around the prism, is adjustably secured a hollow gib or core G of Babbitt metal, or other suitable soft metal, which has a central guide hole $g$ in which the prism slidably fits. In making the gib G the prism is inserted and held in proper position in the sleeve of the arm C and the gib is cast in the sleeve $c$ around the prism. Thus the gib fits perfectly both the flat guide faces of the prism and the tapered bore of the sleeve. The gib is then removed from the sleeve, which can be readily done on account of the tapered bore in the latter. and is slit longitudinally at one or more places, preferably at the three corners of the hole $g$ for the prism where the walls are thinnest, so that by forcing the gib into the tapered bore of the sleeve it can be contracted about the prism sufficiently to form a sliding fit without looseness on the prism. The slits, which are shown at $g'$, Fig. 5, preferably extend from opposite ends of the gib, with the inner ends of the slits in one end of the gib overlapping and close to the inner ends of the slits in the opposite end of the gib. The segments of the gib are thus connected and held in position by the narrow strips of metal between the overlapping inner ends of the slits, and when the gib is forced into the tapered bore of the arm it will contract uniformly from end to end about the prism and will bear equally on the prism from end to end thereof.

The gib is preferably formed with longitudinal ribs $g^2$ which fit in corresponding internal grooves in the sleeve $c$ to prevent the gib from turning in the sleeve, one of these ribs being larger than the others, so that the gib cannot be improperly positioned when replaced in the sleeve. The gib is secured in the sleeve $c$ by adjusting rings H H' screwed into the ends of the sleeve $c$ at opposite ends of the gib. These rings H H' are notched for the reception of a tool for turning them, one of the notches of the upper ring being shown at $h$, Fig. 2, and by unscrewing one ring and screwing in the other ring the gib can be forced into the sleeve more or less as required in order to embrace the prism just closely enough to produce an easy sliding fit without looseness or lateral play thereon. As the tapered bore of the sleeve $c$ is of circular cross-section it can be drilled at small expense and without especial skill. There are no flat faces either in the sleeve or the gib which have to be planed to fit the flat faces of the prism and consequently the machine work on the tube-carrying-arm is very materially reduced.

The micrometer screw E, as shown, works in a nut $i$ secured in a cap I screwed into and closing the upper end of the sleeve $c$, and bears on the upper end of a rod or pin K which bears at its lower end on the bottom of a longitudinal bore or spring cavity $k$ in the prism D.

L represents a tube which surrounds the pin F and is slidable vertically in the prism through a guide plug $l$ which is screwed into the upper end of the spring cavity $k$. A spring M surrounding this tube L and bearing at one end against a shoulder $m$ at the lower end of the tube and at the other end against the screw plug $l$, presses the tube downwardly and holds a disk $m'$ fastened to the upper end of the tube firmly down on the upper end of the gib G, which, as explained, is stationarily secured in the sleeve of the tube-carrying arm C. When the micrometer screw E is turned so as to screw it in its nut $i$, the pressure thereof on the pin K raises the tube-carrying-arm on the prism against the action of the spring M, and when the micrometer screw is turned in the opposite direction the pull of the spring on the arm C, through the tube L and the disk $m'$ fixed to its upper end, lowers the tube-carrying-arm on the prism.

The disk $m'$, see Figs. 3, 6 and 7, is provided with two holes $n$ in which the legs of a spanner wrench can be inserted to enter notches $n'$ in the top of the guide plug $l$, for screwing the latter into place and unscrewing it. The guide plug can, however, be secured to the upper end of the prism in any other suitable manner. When the guide plug is unscrewed it, together with the tube L and spring M, can be removed as a unit from the cavity in the prism D. This construction of the operating connections between the micrometer screw and the prism enables the same to be located in the single longitudinal bore in the prism and avoids the necessity for securing a stud or projection to the sleeve $c$ of the tube-carrying arm for the attachment of the spring, and for slotting the prism to receive such stud, as is done in some microscopes.

The guiding means described are not restricted in application to a microscope provided with the particular fine adjustment mechanism described and, vice versa, the described fine adjustment mechanism can be employed in a microscope provided with the usual or other suitable guiding means for the tube-carrying-arm.

We claim as our invention:

1. In a microscope, the combination with the supporting column, and the tube-carrying-arm having a hollow portion surrounding the column, of a contractible gib in said hollow portion of the arm and embracing the column, and means for contracting the gib around the column, substantially as set forth.

2. In a microscope, the combination with the supporting column, and the tube-carrying-arm having an internally tapered hollow portion surrounding the column, of a tapered contractible gib which fits in said hollow portion of the arm and embraces the column, and means for adjusting the gib longitudinally in the tapered hollow portion of the arm, substantially as set forth.

3. In a microscope, the combination with the supporting column, and the tube-carrying-arm having an internally tapered hollow portion surrounding the column, of a tapered split gib which embraces the column in said hollow portion of the arm, and means for adjusting the gib longitudinally in the tapered hollow portion of the arm to contract it about the column, substantially as set forth.

4. In a microscope, the combination with the supporting column, and the tube-carrying-arm having an internally tapered hollow portion surrounding the column, of a gib which is cast to fit the space in said hollow portion of the arm around the column and is split so that it can be contracted about the column, and means for adjusting the gib longitudinally in the tapered hollow portion of the arm, substantially as set forth.

5. In a microscope, the combination with the supporting prism, and the tube-carrying-arm having a portion with a tapering circular bore surrounding the prism, of a split gib which fits in said tapering bore of the arm and embraces the prism, said gib having portions which engage with portions of the arm to prevent the gib from turning in said bore, and screw rings for adjusting the gib longitudinally in said bore to contract it about the prism, substantially as set forth.

6. In a microscope, the combination with the supporting column, and the tube-carrying-arm which is adjustable on the column, of an adjusting screw for the tube-carrying-arm, a member which is slidable lengthwise in a longitudinal cavity in the column and has a part of its outer end which bears against a part on the tube-carrying-arm, a pin bearing on said column for transmitting a thrust of the screw, and a spring located in said cavity and acting on said slidable member to oppose the movement of the tube-carrying-arm by said screw, substantially as set forth.

7. In a microscope, the combination with the supporting column having a longitudinal spring cavity, and the tube-carrying-arm which is adjustable on the column, of an adjusting screw having a threaded bearing on the tube-carrying-arm, a pin located in said spring cavity and bearing at opposite ends against said screw and against the bottom of said spring cavity, a tube which surrounds said pin in said spring cavity and has a part at its outer end which bears on a part on the tube-carrying-arm, and a spring in said cavity and bearing at opposite ends against a part of said tube and against a part at the outer end of said spring cavity, substantially as set forth.

Witness our hands, this 15th day of November, 1909.

HARVEY N. OTT.
KONRAD LEUCHSENRING.

Witnesses:
C. W. PARKER,
C. B. HORNBECK.

---

Copies of this patent may be obtained for five cents each, by addressing the "Commissioner of Patents, Washington, D. C."